(12) United States Patent
Champion et al.

(10) Patent No.: US 7,693,103 B2
(45) Date of Patent: Apr. 6, 2010

(54) SYSTEM AND METHOD FOR AUTOMATICALLY PERFORMING A CHANNEL SELECTION PROCEDURE IN A WIRELESS NETWORK

(75) Inventors: Mark Champion, Kenmore, WA (US); Robert Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1601 days.

(21) Appl. No.: 10/937,162

(22) Filed: Sep. 9, 2004

(65) Prior Publication Data

US 2006/0050646 A1    Mar. 9, 2006

(51) Int. Cl.
 *H04W 4/00* (2009.01)
 *H04W 72/00* (2009.01)
 *H04L 12/28* (2006.01)
 *G06F 15/16* (2006.01)

(52) U.S. Cl. ............... 370/329; 370/431; 709/227; 455/434; 455/450

(58) Field of Classification Search ......... 370/328–330, 370/336–338, 342–345, 431, 437, 441, 442; 709/227; 455/455, 450, 434
See application file for complete search history.

(56) References Cited

U.S. PATENT DOCUMENTS

| | | | |
|---|---|---|---|
| 5,408,682 A * | 4/1995 | Ranner et al. ............ 455/166.2 |
| 5,673,259 A | 9/1997 | Quick, Jr. |
| 5,963,557 A * | 10/1999 | Eng ............................ 370/432 |
| 6,185,433 B1 * | 2/2001 | Lele et al. ................... 455/528 |
| 6,219,553 B1 | 4/2001 | Panasik ....................... 455/446 |
| 6,452,913 B1 | 9/2002 | Proctor, Jr. |
| 6,940,543 B2 * | 9/2005 | Perotti et al. .............. 348/211.2 |
| 6,983,128 B2 * | 1/2006 | Wright ......................... 455/73 |
| 7,010,604 B1 * | 3/2006 | Munger et al. .............. 709/227 |
| 7,103,086 B2 * | 9/2006 | Steed et al. .................. 375/132 |
| 2002/0101835 A1 | 8/2002 | Gerakoulis |

* cited by examiner

*Primary Examiner*—Nittaya Juntima
(74) *Attorney, Agent, or Firm*—Gregory J. Koerner; Redwood Patent Law

(57) ABSTRACT

A system and method for automatically performing a channel selection procedure in a wireless network includes a forward transmitter that embeds an identifier into forward data that is transmitted over a forward link. A forward receiver then receives the forward data on the forward link, and removes the identifier from the forward data. A reverse transmitter receives the identifier from the forward receiver, and embeds the identifier into reverse data that is transmitted over a reverse link on a selected reverse channel chosen from among a plurality of available reverse channels. A reverse receiver then searches the reverse channels to identify the selected reverse channel containing reverse data with the identifier embedded. The reverse receiver may then utilize the reverse data received over the identified reverse channel.

43 Claims, 8 Drawing Sheets

SYSTEM AND METHOD FOR AUTOMATICALLY PERFORMING A CHANNEL SELECTION PROCEDURE IN A WIRELESS NETWORK

BACKGROUND SECTION

1. Field of the Invention

This invention relates generally to techniques for implementing wireless electronic systems, and relates more particularly to a system and method for automatically performing a channel selection procedure in a wireless network.

2. Description of the Background Art

Developing effective methods for implementing wireless electronic systems is a significant consideration for designers and manufacturers of contemporary electronic technology. However, effectively implementing wireless electronic systems may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capabilities to perform various advanced operations may provide additional benefits to a system user, but may also place increased demands on the control and management of various system components. For example, an enhanced wireless entertainment system that effectively handles video and audio content may benefit from an efficient implementation because of the large amount and complexity of the digital data involved.

Designing wireless electronic devices that provide various types of enhanced device functionality while still maintaining a sufficient level of user-friendliness and ease-of-operation is another significant consideration when implementing electronic devices for use in certain environments in which the relative level of technical sophistication of device users is not particularly high. In addition, various types of streamlined and automated functionalities may frequently be beneficial in order to allow device users to advantageously utilize their time and energy for performing other productive tasks. For example, wireless electronic systems that automatically address potential wireless communication problems such as signal interference from other wireless systems may prove beneficial to many system users.

Due to growing demands on system resources, potential problems with regard to operating technologically sophisticated systems, and the prevalence of substantially increasing data magnitudes, it is apparent that developing new techniques for effectively implementing wireless electronic systems is a matter of concern for related electronic technologies. Therefore, for all the foregoing reasons, developing effective techniques for implementing wireless electronic systems remains a significant consideration for designers, manufacturers, and users of contemporary wireless electronic systems.

SUMMARY

In accordance with the present invention, a system and method are disclosed for automatically performing a channel selection procedure in a wireless network. In accordance with one embodiment of the present invention, an electronic system includes, but is not limited to, a data source, a source communications manager, a destination communications manager, and a data destination. The data source provides forward data to the source communications manager that includes, but is not limited to, a forward transmitter and a reverse receiver.

The forward transmitter transmits the forward data to the destination control manager in a wireless manner via a forward link by utilizing any effective transmission techniques. For example, in certain embodiments, the forward link is implemented as a highly directional beam-like transmission that operates in the range of approximately 60 gigahertz. The destination control manager includes, but is not limited to, a forward receiver and a reverse transmitter. The forward receiver receives the forward data over the forward link, and then provides the forward data to the data destination.

In certain situations, the data destination or the destination communications manager may need to transmit various types of reverse data back to the source communications manager or the data source. Such reverse data may include any desired type of information or data. For example, the reverse data may include various types of control information or status information. The reverse transmitter therefore transmits the foregoing reverse data to the source communications manager via a reverse link that may be implemented in any effective manner. In certain embodiments, the reverse link may be implemented as an omni-directional transmission that operates on a selectable reverse channel chosen from among eighty-three different reverse channels in the range of approximately 2.4 gigahertz.

Once the reverse transmitter selects a reverse channel for the reverse link, then the reverse receiver of the source communications manager may perform a channel search procedure to identify and lock onto the particular reverse channel used by the reverse transmitter for transmitting the reverse data over the reverse link. The reverse receiver may then receive and provide the transmitted reverse data to the source communications manager or to the data source In certain operating environments, multiple different wireless electronic systems may be located in relatively close proximity to each other. In such a situation, because transmitters of each electronic system may be omni-directional, a potential for interference exists in which a given receiver selects an incorrect channel and receives data from the wrong transmitter. In certain embodiments, no channel selection procedure is required for the forward link because correctly coupling a forward receiver to the appropriate forward transmitter may be accomplished by aiming highly directional antennas to establish a line-of-sight wireless connection. However, in accordance with the present invention, a flexible reverse channel selection procedure may be dynamically and automatically performed to correctly couple the reverse receiver to the appropriate matching reverse transmitter.

During the reverse channel selection procedure, the forward transmitter initially generates an original identifier by utilizing any effective techniques. The forward transmitter then provides the original identifier to the reverse receiver. The forward transmitter also embeds the original identifier into the forward data transmitted over the forward link. The forward receiver may then comb the original identifier from the transmitted forward data, and provide the original identifier to the reverse transmitter.

The reverse transmitter then embeds the original identifier into the reverse data without change as a returned identifier, and transmits the reverse data over the reverse link. The reverse receiver responsively searches through the available reverse channels until the returned identifier is detected in the transmitted reverse data. The reverse receiver matches the returned identifier with the previously-received original identifier to verify that the reverse data on the reverse link is from the correct reverse transmitter to thereby complete the reverse channel selection procedure. For at least the foregoing reasons, the present invention therefore provides an improved system and method for automatically performing a channel selection procedure in a wireless network.

DETAILED DESCRIPTION

The present invention relates to an improvement in wireless electronic communication techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for automatically performing a channel selection procedure in a wireless network, and includes a forward transmitter that embeds an identifier into forward data that is transmitted over a forward link. A forward receiver then receives the forward data on the forward link, and removes the identifier from the forward data. A reverse transmitter receives the identifier from the forward receiver, and embeds the identifier into reverse data that is transmitted over a reverse link on a selected reverse channel chosen from among a plurality of available reverse channels. A reverse receiver then searches the reverse channels to identify the selected reverse channel containing reverse data with the identifier embedded. The reverse receiver may then utilize the identified reverse channel for effectively receiving the reverse data.

Figure 1:
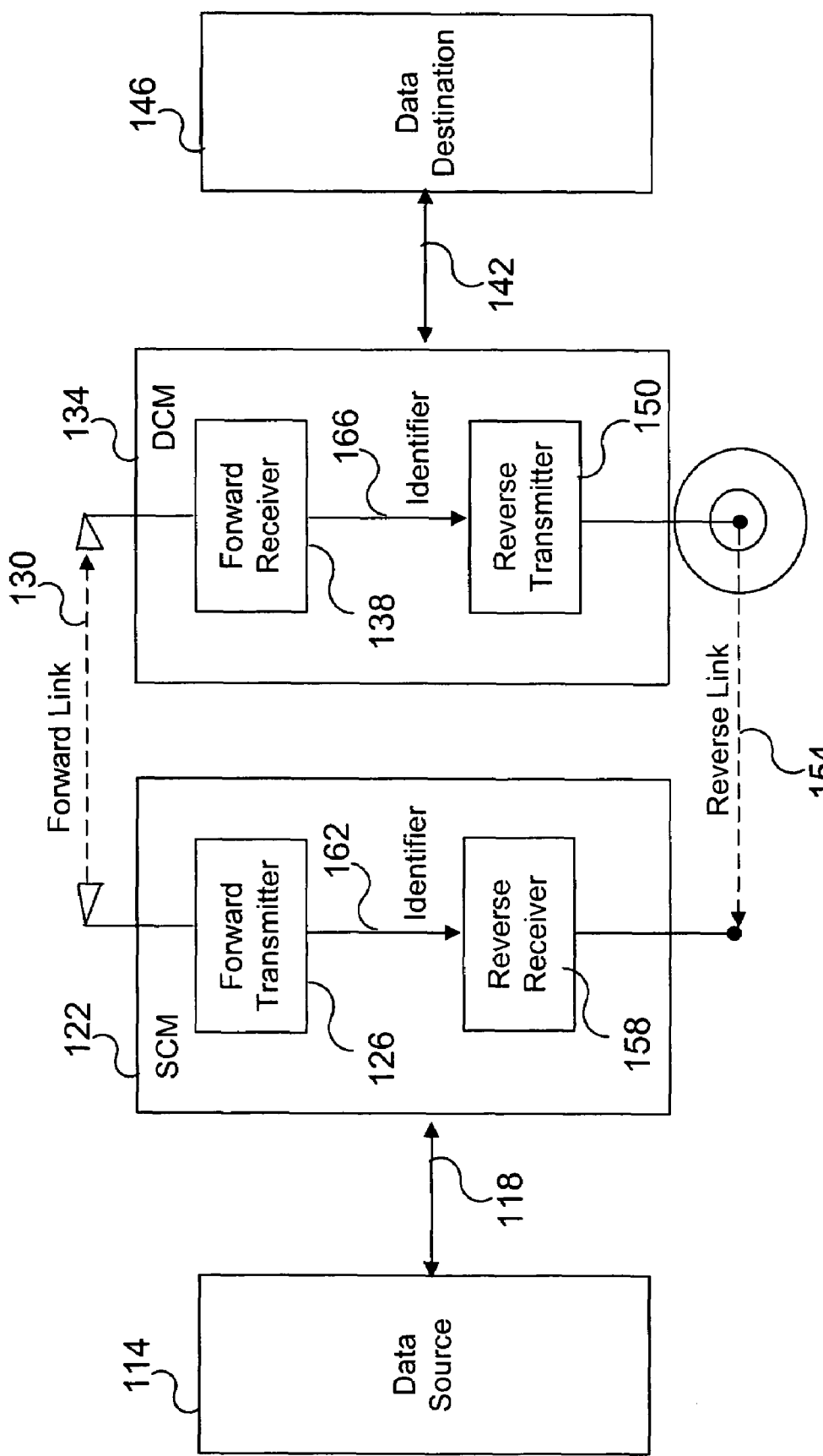
FIG. 1 is a block diagram of an electronic system, in accordance with one embodiment of the present invention.

Referring now to FIG. 1, a block diagram of an electronic system 110 is shown, in accordance with one embodiment of the present invention. In the FIG. 1 embodiment, electronic system 110 includes, but is not limited to, a data source 114, a source communications manager (SCM) 122, a destination communications manager (DCM) 134, and a data destination 146. In alternate embodiments, electronic system 110 may readily be implemented using components and configurations in addition to, or instead of, certain of those components and configurations discussed in conjunction with the FIG. 1 embodiment.

In the FIG. 1 embodiment, data source 114 may be implemented in any effective manner to provide any desired type of data or information to data destination 146. In certain embodiments, data source 114 is implemented as a video data source that provides high-definition video programming to data destination 146 which is implemented as a video programming display device. In the FIG. 1 embodiment, data source 114 provides forward data to source communications manager (SCM) 122 via path 118. In the FIG. 1 embodiment, SCM 122 includes, but is not limited to, a forward transmitter 126 and a reverse receiver 158.

In the FIG. 1 embodiment, forward transmitter 126 transmits the forward data to destination control manager (DCM) 134 in a wireless manner via a forward link 130 by utilizing any effective transmission techniques. For example, in certain embodiments, forward link 130 may be implemented as a highly directional beam-like transmission that operates in the range of approximately 60 gigahertz. In the FIG. 1 embodiment, DCM 134 includes, but is not limited to, a forward receiver 138 and a reverse transmitter 150. In the FIG. 1 embodiment, forward receiver 138 receives the forward data over forward link 130, and then provides the forward data to data destination 146 via path 142.

In the FIG. 1 embodiment, data destination 146 or DCM 134 may need to transmit various types of reverse data back to SCM 122 or data source 114. Such reverse data may include any desired type of information or data. For example, the reverse data may include various types of control information or status information. The reverse data may include status information regarding the current state of data destination 146, or control information for data source 114 that is initially provided by a system user to data destination 146 with a remote control unit or other means. The reverse data may also include internal control information from DCM 134, such as a request for instructing SCM 122 to increase the transmit power level of forward transmitter 126.

In the FIG. 1 embodiment, reverse transmitter 150 wirelessly transmits the reverse data to SCM 122 via a reverse link 154 that may be implemented in any effective manner. In certain embodiments, reverse link 154 may be implemented as an omni-directional transmission that operates on a selectable reverse channel chosen from among eighty-three different reverse channels in the range of approximately 2.4 gigahertz. Once reverse transmitter 150 selects a reverse channel for reverse link 154, then reverse receiver 158 of SCM 122 performs a channel search procedure to identify and lock onto the particular reverse channel used by reverse transmitter 150 for reverse link 154. Reverse receiver 158 may then receive and provide the transmitted reverse data to SCM 122, or may provide the reverse data to data source 114 via path 118.

In certain operating environments, multiple different instances of electronic system 110 (or other wireless devices) may be located in relatively close proximity to each other. For example, a home environment may have one instance of electronic system 110 in the living room, and may have another instance of electronic system 110 in the family room. In such a situation, because the reverse transmitter 150 of each electronic system 110 is omni-directional, a potential for reverse link interference exists in which a given reverse receiver 158 selects an incorrect reverse channel and receives reverse data from the wrong reverse transmitter 150.

In certain conventional systems, matching identifier codes may be embedded in SCM 122 and DCM 134 to identify matched pairs of reverse transmitters and receivers. However, this inflexible approach only supports matched sets of SCMs 122 and DCMs 134, and fails to allow dynamically selecting reverse channels for any corresponding pair of SCM 122 and DCM 134. In accordance with the present invention, a flexible reverse channel selection procedure may be dynamically and automatically performed by electronic system 110 to correctly couple a reverse receiver 158 to a matching reverse transmitter 150 from the same electronic system 110.

In the FIG. 1 embodiment, forward transmitter 126 initially generates an original identifier by utilizing any effective techniques. Forward transmitter 126 provides the original identifier to reverse receiver 158 via path 162. Forward transmitter 126 also embeds the original identifier into the forward data transmitted over forward link 130. Forward receiver 138 then combs the original identifier from the transmitted forward data, and provides the original identifier to reverse transmitter 150 via path 166.

In the FIG. 1 embodiment, reverse transmitter 150 embeds the original identifier into the reverse data without change as a returned identifier, and transmits the reverse data over reverse link 154. Reverse receiver 158 of SCM 122 responsively searches through the available reverse channels until the returned identifier is detected in the transmitted reverse data. Reverse receiver 158 matches the returned identifier with the previously-received original identifier to verify that the reverse data on reverse link 154 is from the correct reverse transmitter 150 to thereby complete the reverse channel selection procedure. The implementation and utilization of the FIG. 1 electronic system 110 is further discussed below in conjunction with FIGS. 2 through 8.

Figure 2:
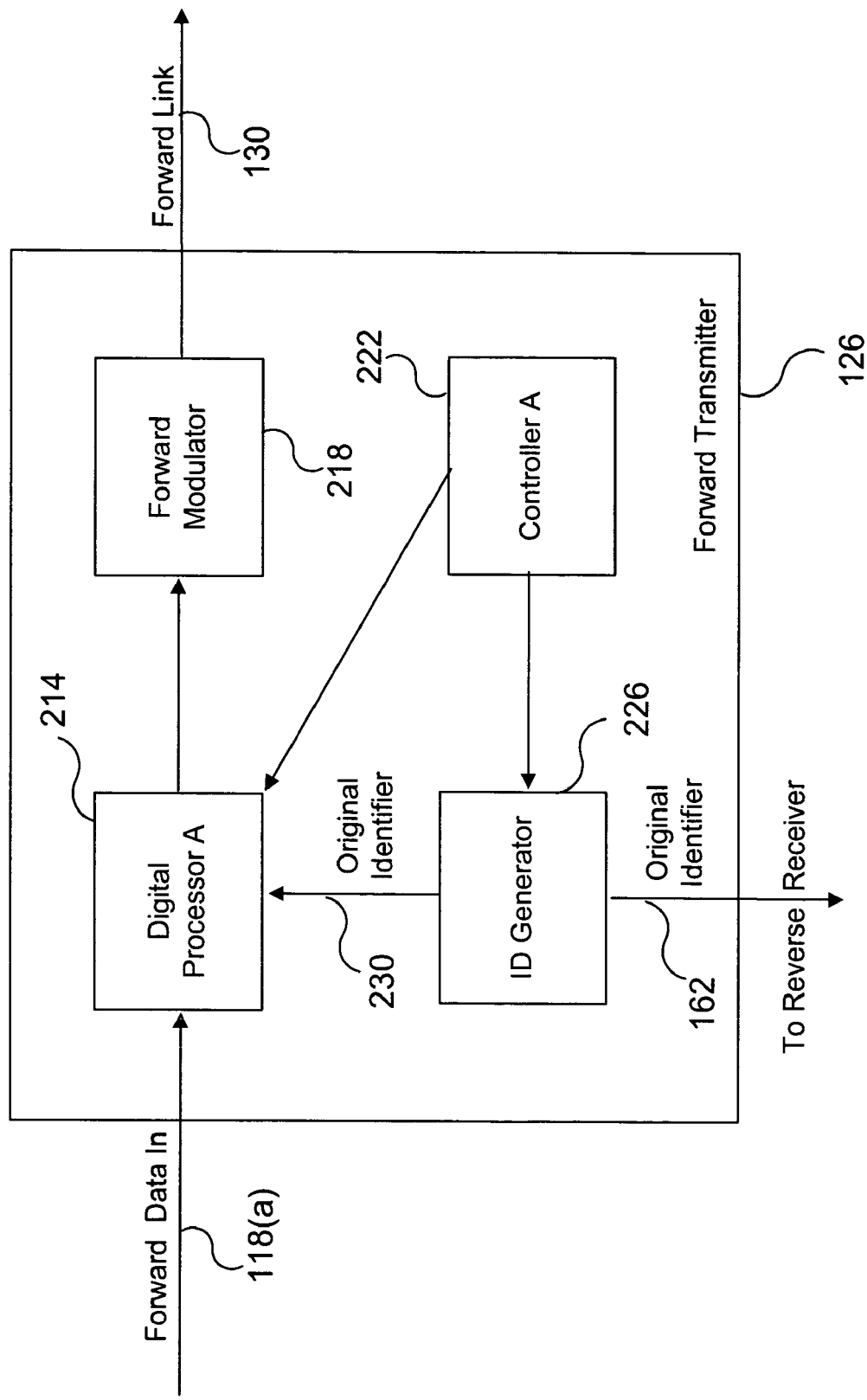
FIG. 2 is a block diagram for one embodiment of the forward transmitter from FIG. 1, in accordance with the present invention.

Referring now to FIG. 2, a block diagram for one embodiment of the FIG. 1 forward transmitter 126 is shown, in accordance with the present invention. In the FIG. 2 embodiment, forward transmitter 126 includes, but is not limited to, a digital processor A 214, a forward modulator 218, a controller A 222, and an ID generator 226. In alternate embodiments, forward transmitter 126 may be implemented using components and configurations in addition to, or instead of, certain of those components and configurations discussed in conjunction with the FIG. 2 embodiment.

In the FIG. 2 embodiment, digital processor A 214 initially receives a Forward Data In signal from data source 114 (FIG. 1) via path 118(a). Digital processor A 214 may then perform any desired type of processing operations upon the Forward Data In to produce processed forward data. For example, digital processor A 214 may perform various forward error correction, format conversion, or packetizing procedures upon Forward Data In to produce processed forward data. Digital processor A 214 then provides the processed forward data to forward modulator 218 which responsively performs a modulation procedure upon the processed forward data to produce modulated forward data that is transmitted over forward link 130 to a forward receiver 138 of a DCM 134 (FIG. 1).

In the FIG. 2 embodiment, an ID generator 226 generates an original identifier by utilizing any effective techniques. For example, ID generator 226 may include a pseudo-random number generator that generates a random binary number as the original identifier. The original identifier may be implemented in any desired manner. For example, the original identifier may be implemented as a random binary number of 4-bits, 8-bits, or 16-bits. In certain embodiments, the original identifier may be based upon a certain segment of digital information from the Forward Data In received from data source 114.

In the FIG. 2 embodiment, ID generator 226 provides the original identifier to reverse receiver 158 (FIG. 1) via path 162, and also provides the original identifier to digital processor A 214 via path 230. In response, digital processor A 214 embeds the original identifier into the processed forward data so that the original identifier is then transmitted over forward link 130 in the forward data sent to forward receiver 138 (FIG. 1). In the FIG. 2 embodiment, controller A 222 manages the overall operation of forward transmitter 126. The utilization of forward transmitter 126 is further discussed below in conjunction with FIG. 6.

Figure 3:
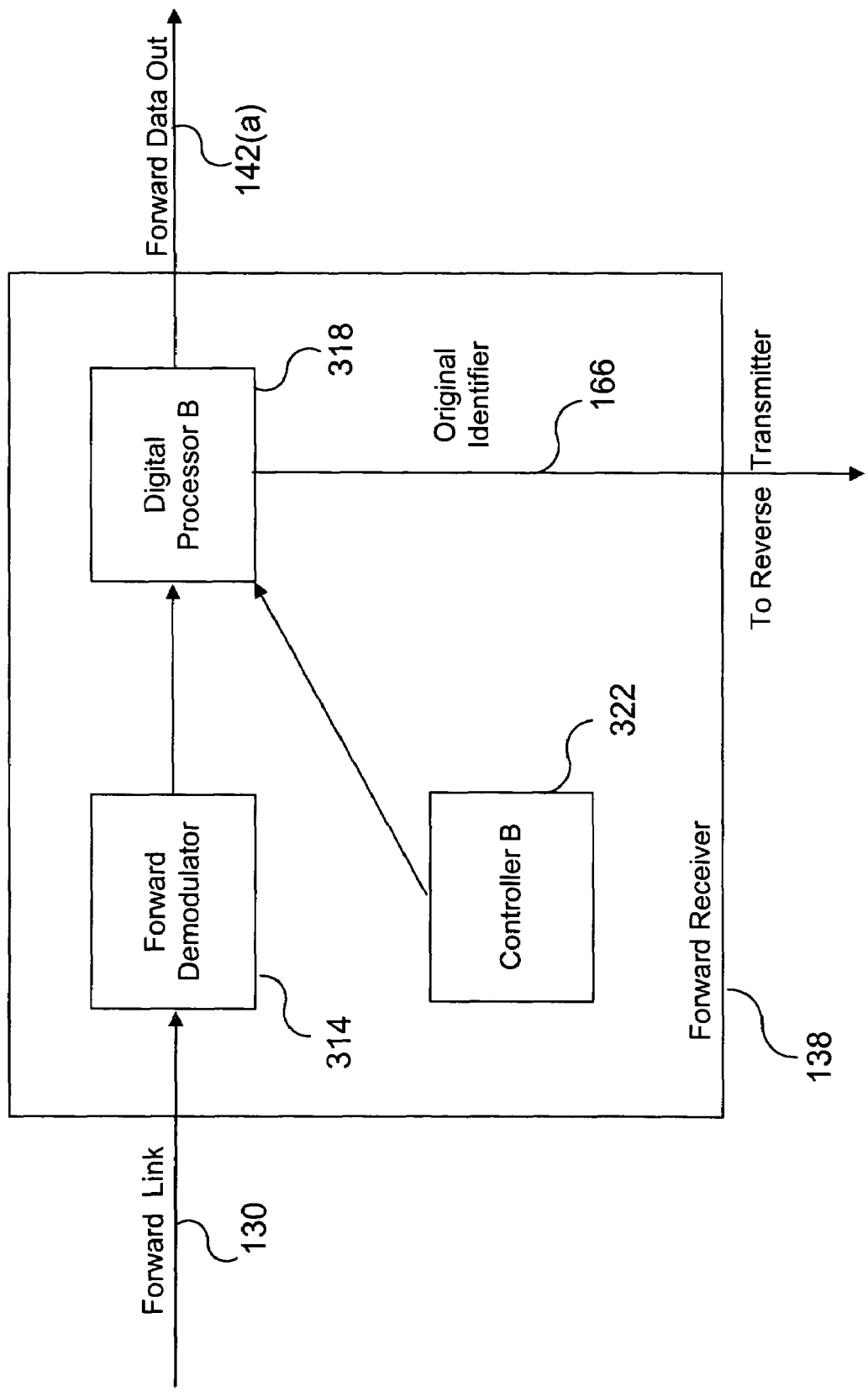
FIG. 3 is a block diagram for one embodiment of the forward receiver from FIG. 1, in accordance with the present invention.

Referring now to FIG. 3, a block diagram for one embodiment of the FIG. 1 forward receiver 138 is shown, in accordance with the present invention. In the FIG. 3 embodiment, forward receiver 138 includes, but is not limited to, a forward demodulator 314, a digital processor B 318, and a controller B 322. In alternate embodiments, forward receiver 138 may be implemented using components and configurations in addition to, or instead of, certain of those components and configurations discussed in conjunction with the FIG. 3 embodiment.

In the FIG. 3 embodiment, forward demodulator 314 initially receives the modulated forward data transmitted over forward link 130 by forward transmitter 126 (FIG. 2). Forward demodulator 314 then performs a demodulation procedure upon the modulated forward data to provide demodulated forward data to digital processor B 318. In the FIG. 3 embodiment, digital processor B 318 may perform any appropriate processing operations upon the demodulated forward data to produce Forward Data Out that is provided to data destination 146 (FIG. 1) via path 142(a). Controller B 322 manages the overall operation of forward receiver 138.

In accordance with the present invention, digital processor B 318 also detects and combs out the original identifier that was embedded in the forward data by forward transmitter 126 (FIG. 2). Digital processor B 318 may then provide the original identifier to reverse transmitter 150 via path 166. The utilization of forward receiver 138 is further discussed below in conjunction with FIGS. 6 and 7.

Figure 4:
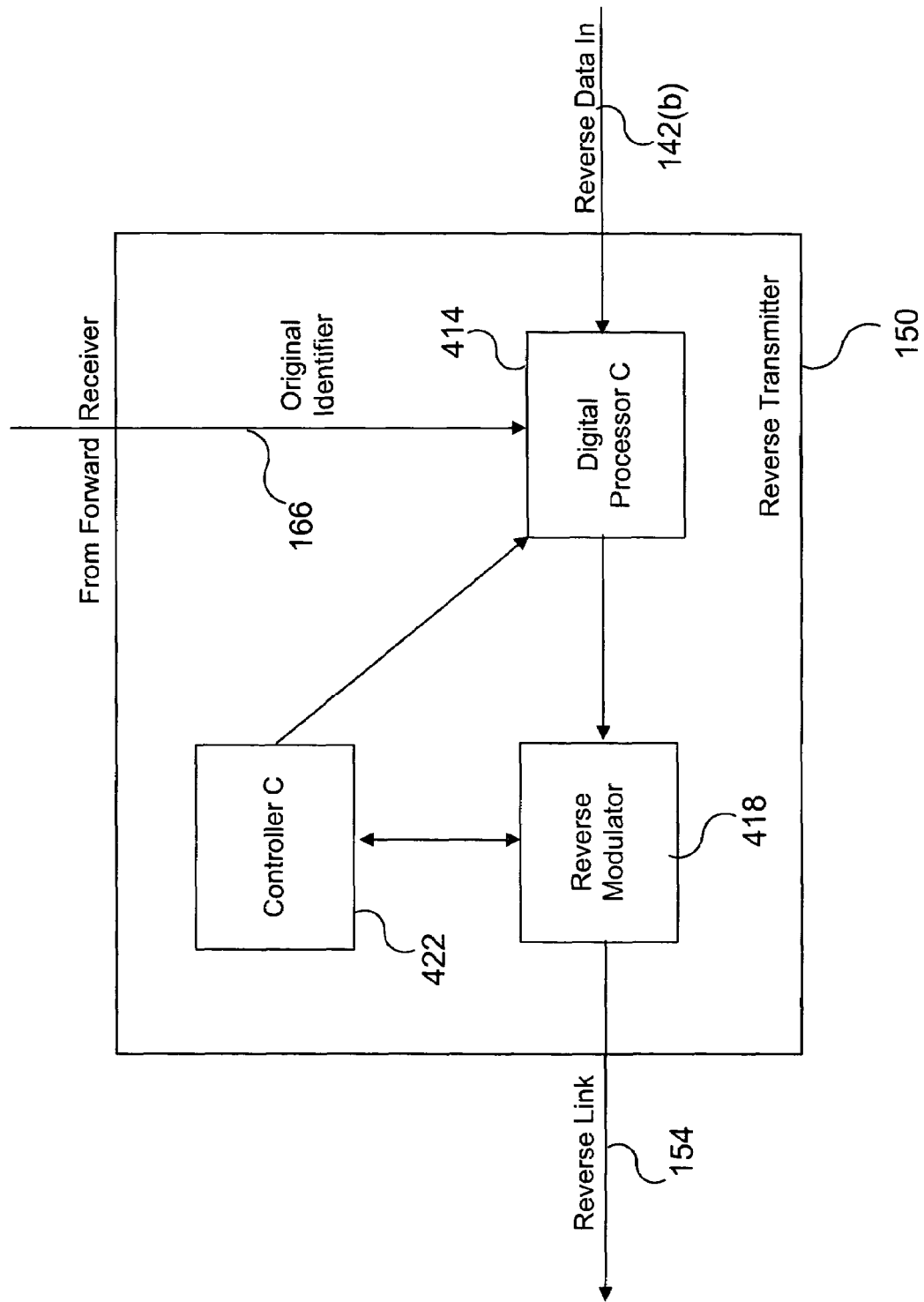
FIG. 4 is a block diagram for one embodiment of the reverse transmitter from FIG. 1, in accordance with the present invention.

Referring now to FIG. 4, a block diagram for one embodiment of the FIG. 1 reverse transmitter 150 is shown, in accordance with the present invention. In the FIG. 4 embodiment, reverse transmitter 150 includes, but is not limited to, a digital processor C 414, a reverse modulator 418, and a controller C 422. In alternate embodiments, reverse transmitter 150 may be implemented using components and configurations in addition to, or instead of, certain of those components and configurations discussed in conjunction with the FIG. 4 embodiment.

In the FIG. 4 embodiment, digital processor C 414 receives Reverse Data In from data destination 146 via path 142(b), and responsively performs appropriate processing procedures to produce processed reverse data. Digital processor C 414 then provides the processed reverse data to reverse modulator 418 which performs a modulation procedure upon the processed reverse data to produce modulated reverse data that is transmitted to reverse receiver 158 of SCM 122 over a selected reverse channel via reverse link 154.

In the FIG. 4 embodiment, controller C 422 may control reverse modulator 418 with regard to selecting an appropriate reverse channel for transmitting reverse data over reverse link 154. In certain embodiments, reverse transmitter 150 may be implemented as a transceiver (transmitter-receiver) device that also utilizes reverse modulator 418 as a demodulator device for listing to reverse channels to determine whether a particular reverse channel is clear of other wireless transmissions, or whether another wireless transmission device is current utilizing that particular reverse channel.

In accordance with the FIG. 4 embodiment, digital processor C 414 receives the original identifier provided by forward receiver 138 via path 166, as discussed above in conjunction with FIG. 3. Digital processor C 414 responsively embeds the received original identifier without change into the processed reverse data as a returned identifier. Reverse modulator 418 may then transmit the reverse data with the embedded returned identifier to reverse receiver 158 (FIG. 1) via reverse link 154. The implementation and utilization of the FIG. 4 reverse transmitter 150 is further discussed below in conjunction with FIG. 7.

Figure 5:
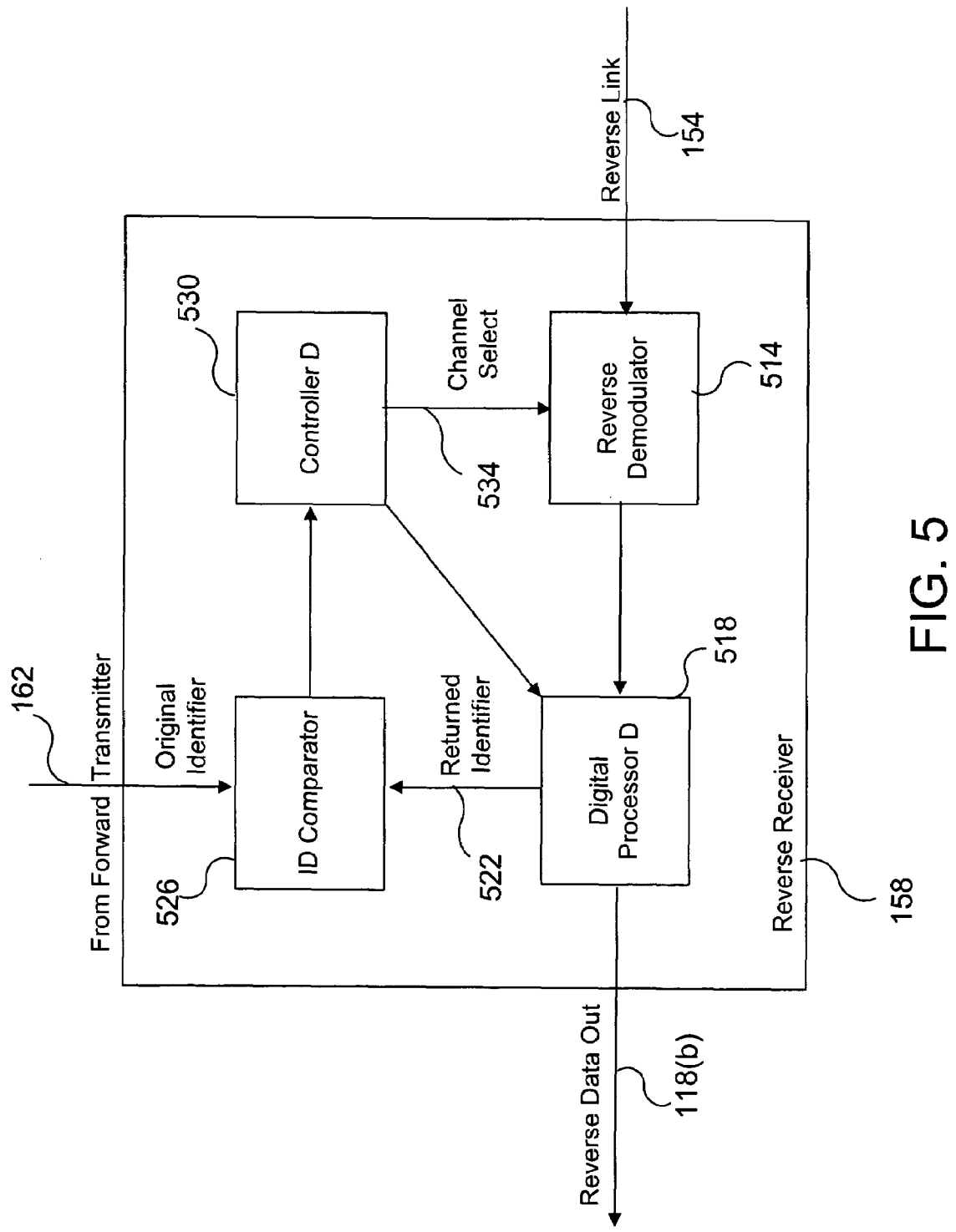
FIG. 5 is a block diagram for one embodiment of the reverse receiver from FIG. 1, in accordance with the present invention.

Referring now to FIG. 5, a block diagram for one embodiment of the FIG. 1 reverse receiver 158 is shown, in accordance with the present invention. In the FIG. 5 embodiment, reverse receiver 158 includes, but is not limited to, a reverse demodulator 514, a digital processor D 518, an ID comparator 526, and a controller D 530. In alternate embodiments, reverse receiver 158 may be implemented using components and configurations in addition to, or instead of, certain of those components and configurations discussed in conjunction with the FIG. 5 embodiment.

In the FIG. 5 embodiment, the forward transmitter 126 of foregoing FIG. 2 initially provides a copy of the original identifier to ID comparator 526 via path 162. Reverse demodulator 514 may then select a given reverse channel for receiving modulated reverse data over reverse link 154. If reverse data is present, reverse demodulator 514 performs a demodulation procedure to generate demodulated reverse data that is provided to digital processor D 518. Digital processor D 518 performs various processing procedures upon the demodulated reverse data to produce Reverse Data Out.

Digital processor D 518 also examines the Reverse Data Out for any potential returned identifiers, and provides any potential returned identifiers to ID comparator 526 via path 522. In response, ID comparator 526 performs a matching procedure that compares the original identifier from forward transmitter 126 and the potential returned identifier from digital processor D 518. If the potential returned identifier matches the original identifier, then reverse receiver 158 is correctly coupled to reverse transmitter 150 on the correct reverse channel of reverse link 154.

In the FIG. 5 embodiment, ID comparator 526 indicates to controller D 530 whether reverse receiver 158 is correctly coupled to the appropriate reverse transmitter 150 based upon the foregoing matching procedure. If reverse receiver 158 is correctly coupled to the appropriate reverse transmitter 150, then controller D 530 instructs digital processor D 518 to transmit the Reverse Data Out to data source 118 via path 118(*b*) to complete the reverse channel selection procedure.

Alternately, if reverse receiver 158 is not correctly coupled to the appropriate reverse transmitter 150, then controller D 530 instructs reverse demodulator 514 via path 534 to switch to another reverse channel of reverse link 154. Reverse receiver 158 may then continue to evaluate additional reverse channels until ID comparator 526 confirms that the foregoing matching procedure has detected the correct returned identifier in reverse data from reverse link 154. The implementation and utilization of the FIG. 5 reverse receiver 158 is further discussed below in conjunction with FIG. 8.

Figure 6:
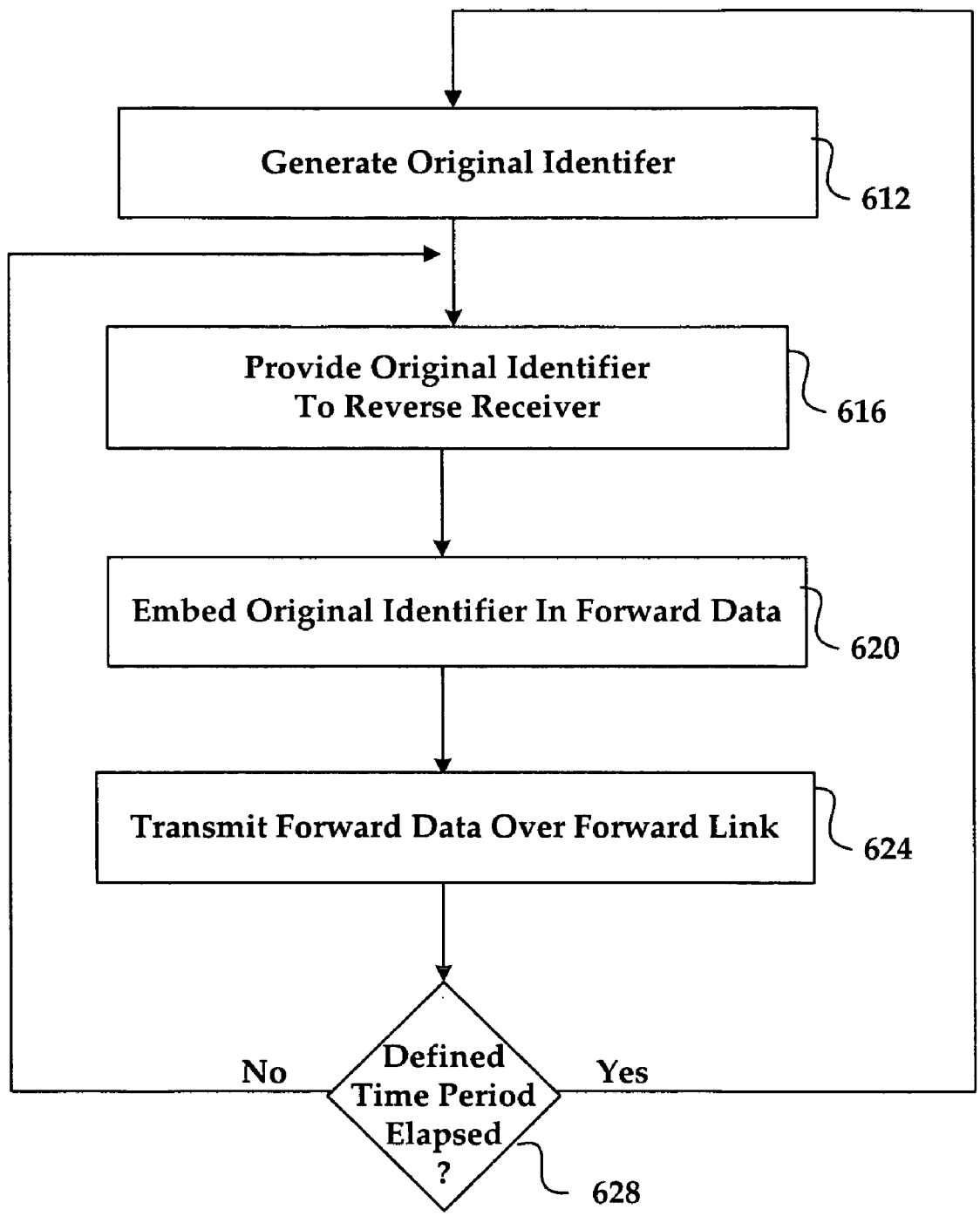
FIG. 6 is a flowchart of method steps for utilizing the forward link of FIG. 1, in accordance with one embodiment of the present invention.

Referring now to FIG. 6, a flowchart of method steps for utilizing the FIG. 1 forward link 130 in a channel selection procedure is shown, in accordance with one embodiment of the present invention. The FIG. 6 example is presented for purposes of illustration, and in alternate embodiments, the present invention may readily utilize steps and sequences other than certain of those discussed in conjunction with the FIG. 6 embodiment.

In the FIG. 6 embodiment, in step 612, a forward transmitter 126 (FIG. 1) initially generates an original identifier by utilizing any effective means. In step 616, forward transmitter 126 provides the original identifier to a reverse receiver 158. Then, in step 620, forward transmitter 126 embeds the original identifier in forward data. In step 624, forward transmitter 126 transmits the forward data with the embedded original identifier over a forward link 130 to a forward receiver 138 (FIG. 1).

In step 628, the forward transmitter 126 determines whether a pre-defined time period has elapsed. The pre-defined time period may be selected to be any effective duration. For example, in certain embodiments, the pre-defined time period may be in the range of approximately 10 seconds. In step 628, if the pre-defined time period has not elapsed, then the FIG. 6 process may return to step 616 to repeat steps 616-628 with the same original identifier. However, in step 628, if the pre-defined time period has elapsed, then the FIG. 6 process may return to initial step 612 to generate and transmit a different original identifier. The channel selection procedure may then continue with the process discussed below in conjunction with FIG. 7.

Figure 7:
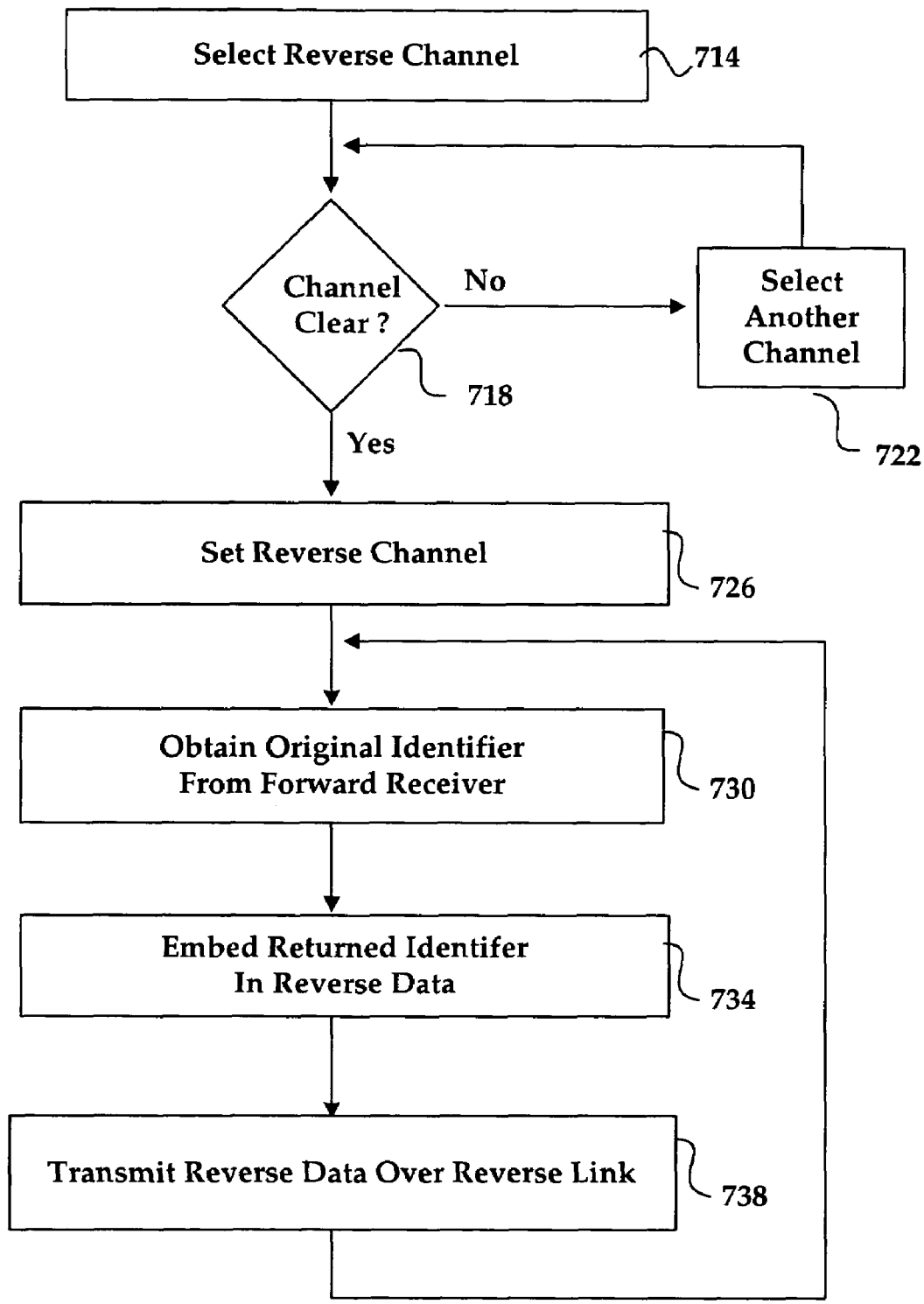
FIG. 7 is a flowchart of method steps for utilizing the reverse transmitter of FIG. 1, in accordance with one embodiment of the present invention.

Referring now to FIG. 7, a flowchart of method steps for utilizing the FIG. 1 reverse transmitter 150 in a channel selection procedure is shown, in accordance with one embodiment of the present invention. The FIG. 7 example is presented for purposes of illustration, and in alternate embodiments, the present invention may readily utilize steps and sequences other than certain of those discussed in conjunction with the FIG. 7 embodiment.

In the FIG. 7 embodiment, in step 714, reverse transmitter 150 initially selects a reverse channel for transmitting reverse data over a reverse link 154 (FIG. 1). In step 718, reverse transmitter 150 evaluates the selected reverse channel to determine whether that reverse channel is clear of wireless transmissions from other wireless electronic systems. If the currently selected reverse channel is not clear, then in step 722, reverse transmitter 150 selects and evaluates another reverse channel of reverse link 154.

However, in step 718, if reverse transmitter 150 determines that the currently selected reverse channel is clear, then in step 726, reverse transmitter 150 sets that reverse channel for transmitting reverse data over reverse link 154. In step 730, reverse transmitter 150 obtains an original identifier from a forward receiver 138, as discussed above in conjunction with FIG. 6. In step 734, reverse transmitter 150 embeds the received original identifier in an unchanged state into the reverse data as a returned identifier.

Then, in step 738, reverse transmitter 150 transmits the reverse data with the embedded returned identifier to a reverse receiver 158 via reverse link 154 (FIG. 1). In certain embodiments, the FIG. 7 process may then return to steps 730-738 for transmitting additional copies of the returned identifier via reverse link 154. The channel selection procedure may then conclude with the process discussed below in conjunction with the following FIG. 8.

Figure 8:
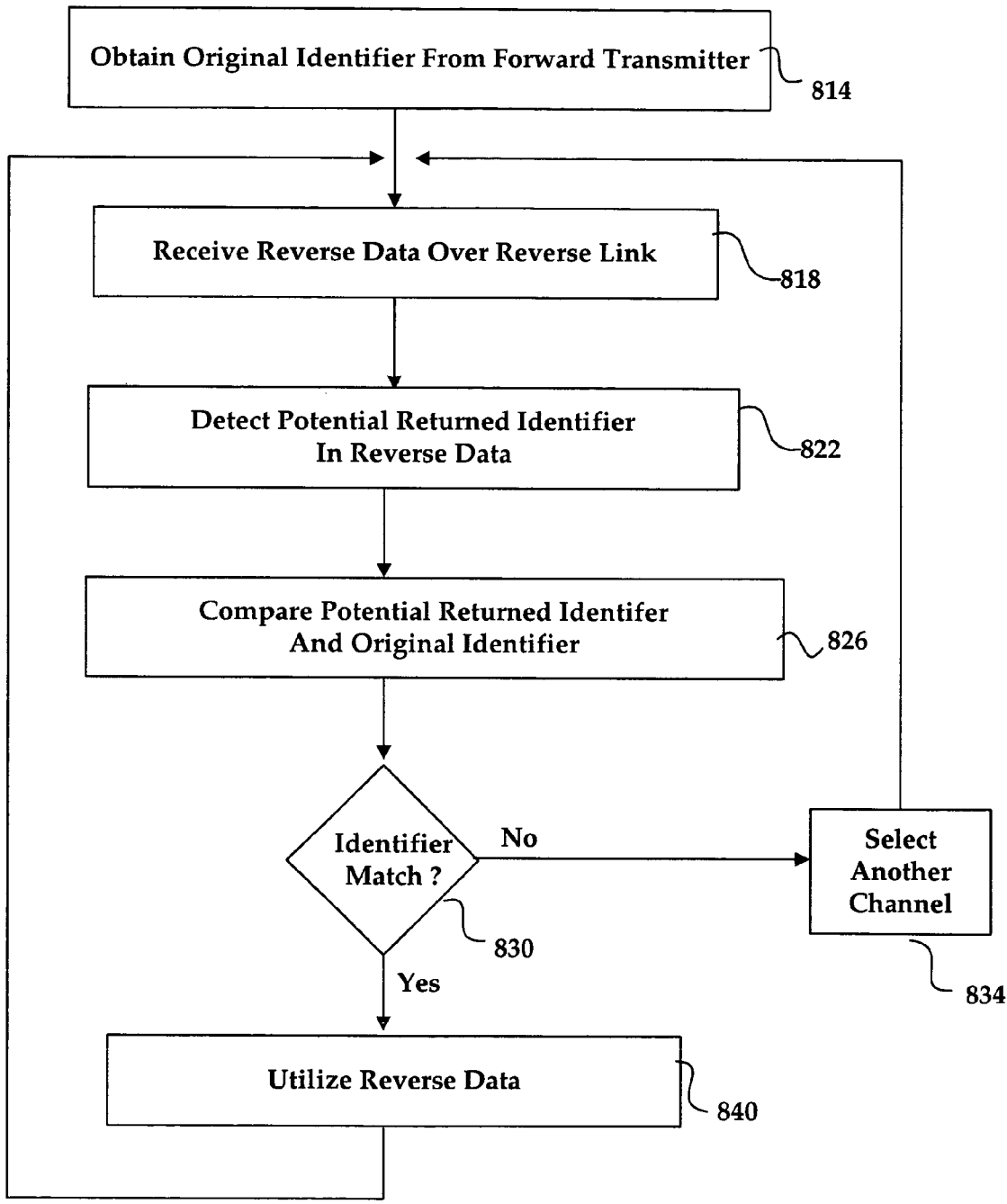
FIG. 8 is a flowchart of method steps for utilizing the reverse receiver of FIG. 1, in accordance with one embodiment of the present invention.

Referring now to FIG. 8, a flowchart of method steps for utilizing the FIG. 1 reverse receiver 158 is shown, in accordance with one embodiment of the present invention. The FIG. 8 example is presented for purposes of illustration, and in alternate embodiments, the present invention may readily utilize steps and sequences other than certain of those discussed in conjunction with the FIG. 8 embodiment.

In the FIG. 8 embodiment, in step 814, a reverse receiver 158 (FIG. 1) initially obtains an original identifier from a forward transmitter 126, as discussed above in conjunction with FIG. 6. In step 818, the reverse receiver 158 receives reverse data from a reverse transmitter 150 (FIG. 1) over a selected reverse channel of a reverse link 154, as discussed above in conjunction with FIG. 7. In step 822, reverse receiver 158 detects a potential returned identifier in the reverse data transmitted over reverse link 154.

In step 826, reverse transmitter 158 performs a matching procedure to compare the potential returned identifier and the foregoing original identifier. In step 830, reverse receiver 158 determines whether an identifier match exists between the potential returned identifier and the original identifier to indicate that reverse receiver 158 is coupled through the selected reverse channel to the correct reverse transmitter 150.

If reverse receiver 158 determines that there is no identifier match, then in step 834, reverse receiver 158 selects another reverse channel and returns to step 818 to examine additional potential returned identifiers for an identifier match. However, in step 830, if reverse receiver 158 determines that there is an identifier match, then in step 840, reverse receiver 158 may provide the current reverse data to an appropriate data destination for utilization. In certain embodiments, the FIG. 8 process may then return to step 818 to examine any additional returned identifiers from reverse transmitter 150 over reverse link 154. For at least the foregoing reasons, the present invention therefore provides an improved system and method for automatically performing a channel selection procedure in a wireless network.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing a reverse channel selection procedure, comprising:
   a forward transmitter that embeds an identifier into forward data that is transmitted over a forward link, said identifier being randomly selected by an ID generator;
   a forward receiver that receives said forward data on said forward link, said forward receiver removing said identifier from said forward data;
   a reverse transmitter that receives said identifier from said forward receiver, said reverse transmitter embedding said identifier into reverse data that is transmitted on one of a plurality of reverse channels over a reverse link; and
   a reverse receiver that searches said plurality of said reverse channels to locate said one of said plurality of said reverse channels containing said reverse data with said identifier embedded, said reverse receiver then utilizing said reverse data received over said one of said plurality of said reverse channels.

2. The system of claim 1 further comprising a data source that initially provides said forward data to a source communications manager that includes said forward transmitter and said reverse receiver.

3. The system of claim 2 further comprising a data destination that receives said forward data from a destination communications manager that includes said forward receiver and said reverse transmitter.

4. The system of claim 1 wherein said reverse channel selection procedure ensures that said reverse receiver is correctly coupled to receive said reverse data only from said reverse transmitter by utilizing said identifier to locate said one of said plurality of said reverse channels, said reverse channel selection procedure thus preventing unwanted interference over said reverse channel from other proximate wireless devices.

5. The system of claim 1 wherein said forward link is implemented as a highly-directional wireless transmission that operates in a forward link range of approximately 60 gigahertz, said reverse link being implemented as an omni-directional wireless transmission that operates in a reverse link range of approximately 2.4 gigahertz, said plurality of said reverse channels including approximately eighty-three discrete reverse channels.

6. The system of claim 1 wherein a digital processor A processes said forward data, and a forward modulator modulates said forward data before said forward data is transmitted to said forward receiver.

7. The system of claim 1 wherein an ID generator coupled to said forward transmitter initially generates said identifier as an original identifier.

8. The system of claim 7 wherein said ID generator utilizes a pseudo-random generator to generate said original identifier.

9. The system of claim 7 wherein said ID generator provides said original identifier to said reverse receiver, said ID generator also providing said original identifier to a digital processor A of said forward transmitter for embedding into said forward data.

10. The system of claim 1 wherein a forward demodulator demodulates said forward data, and a digital processor B processes said forward data before said forward data is provided to a data destination.

11. The system of claim 1 wherein a digital processor B of said forward receiver combs an original identifier out of said forward data, said original identifier being initially embedded into said forward data by said forward transmitter, said digital processor B then providing said original identifier to said reverse transmitter.

12. The system of claim 1 wherein a digital processor C processes said reverse data, and a reverse modulator modulates said reverse data before said reverse data is transmitted to said reverse receiver on said reverse link.

13. The system of claim 1 wherein said reverse data includes status information corresponding to a data destination that utilizes said forward data, said reverse data further including control information for controlling a data source that initially provides said forward data, said reverse data also including internal control/status information from a destination communications manager to either said data source or a source communications manager.

14. The system of claim 1 wherein a digital processor C of said reverse transmitter embeds said identifier as a returned identifier into said reverse data before a reverse modulator of said reverse transmitter modulates said reverse data for transmitting over said reverse link.

15. The system of claim 1 wherein a reverse demodulator of said reverse receiver demodulates said reverse data from said reverse link, and wherein a digital processor D of said reverse receiver combs said identifier as a returned identifier from said reverse data.

16. The system of claim 1 wherein said reverse receiver includes an ID comparator that compares an original identifier from said forward transmitter with a potential returned identifier from said reverse transmitter to determine whether said reverse receiver is correctly coupled to said reverse transmitter on said one of said plurality of said reverse channels.

17. The system of claim 16 wherein a controller D instructs said reverse receiver to select a different one of said plurality of said reverse channels when said ID comparator determines that said reverse receiver is not correctly coupled to said reverse transmitter, said controller D instructing a digital processor D to provide said reverse data to a data destination when said ID comparator determines that said reverse receiver is correctly coupled to said reverse transmitter.

18. A system for performing a reverse channel selection procedure, comprising:
a forward transmitter that embeds an identifier into forward data that is transmitted over a forward link;
a forward receiver that receives said forward data on said forward link, said forward receiver removing said identifier from said forward data;
a reverse transmitter that receives said identifier from said forward receiver, said reverse transmitter embedding said identifier into reverse data that is transmitted on one of a plurality of reverse channels over a reverse link;
a reverse receiver that searches said plurality of said reverse channels to locate said one of said plurality of said reverse channels containing said reverse data with said identifier embedded, said reverse receiver then utilizing said reverse data received over said one of said plurality of said reverse channels;
a data source that initially provides said forward data to a source communications manager that includes said forward transmitter and said reverse receiver; and
a data destination that receives said forward data from a destination communications manager that includes said forward receiver and said reverse transmitter, said data source including a video programming source, said forward data including video program data, and said data destination including a video programming display device.

19. A system for performing a reverse channel selection procedure, comprising:
a forward transmitter that embeds an identifier into forward data that is transmitted over a forward link, an ID generator coupled to said forward transmitter initially generates said identifier as an original identifier, said forward transmitter utilizing a random segment of said forward data as said original identifier;
a forward receiver that receives said forward data on said forward link, said forward receiver removing said identifier from said forward data;
a reverse transmitter that receives said identifier from said forward receiver, said reverse transmitter embedding said identifier into reverse data that is transmitted on one of a plurality of reverse channels over a reverse link; and
a reverse receiver that searches said plurality of said reverse channels to locate said one of said plurality of said reverse channels containing said reverse data with said identifier embedded, said reverse receiver then utilizing said reverse data received over said one of said plurality of said reverse channels.

20. A system for performing a reverse channel selection procedure, comprising:
a forward transmitter that embeds an identifier into forward data that is transmitted over a forward link;
a forward receiver that receives said forward data on said forward link, said forward receiver removing said identifier from said forward data;
a reverse transmitter that receives said identifier from said forward receiver, said reverse transmitter embedding said identifier into reverse data that is transmitted on one of a plurality of reverse channels over a reverse link, said reverse transmitter being implemented as a transceiver device that evaluates said one of said plurality of said reverse channels to ensure that said one of said plurality of said reverse channels is clear before transmitting said reverse data; and
a reverse receiver that searches said plurality of said reverse channels to locate said one of said plurality of said reverse channels containing said reverse data with said identifier embedded, said reverse receiver then utilizing said reverse data received over said one of said plurality of said reverse channels.

21. A method for performing a reverse channel selection procedure, comprising the steps of:
utilizing a forward transmitter to embed an identifier into forward data that is transmitted over a forward link, said identifier being randomly selected by an ID generator;
receiving said forward data on said forward link with a forward receiver that removes said identifier from said forward data;
utilizing a reverse transmitter to embed said identifier into reverse data that is transmitted on one of a plurality of reverse channels over a reverse link; and
searching said plurality of said reverse channels with a reverse receiver to locate said one of said plurality of said reverse channels containing said reverse data with said identifier embedded, said reverse receiver then utilizing said reverse data received over said one of said plurality of said reverse channels.

22. The method of claim 21 further comprising a data source that initially provides said forward data to a source communications manager that includes said forward transmitter and said reverse receiver.

23. The method of claim 22 further comprising a data destination that receives said forward data from a destination communications manager that includes said forward receiver and said reverse transmitter.

24. The method of claim 21 wherein said reverse channel selection procedure ensures that said reverse receiver is correctly coupled to receive said reverse data only from said reverse transmitter by utilizing said identifier to locate said one of said plurality of said reverse channels, said reverse channel selection procedure thus preventing unwanted interference over said reverse channel from other proximate wireless devices.

25. The method of claim 21 wherein said forward link is implemented as a highly-directional wireless transmission that operates in a forward link range of approximately 60 gigahertz, said reverse link being implemented as an omnidirectional wireless transmission that operates in a reverse link range of approximately 2.4 gigahertz, said plurality of said reverse channels including approximately eighty-three discrete reverse channels.

26. The method of claim 25 wherein said eighty-three discrete reverse channels discriminate said reverse data based upon frequencies, time-slices, or other transmission characteristics.

27. The method of claim 21 wherein a digital processor A processes said forward data, and a forward modulator modulates said forward data before said forward data is transmitted to said forward receiver.

28. The method of claim 21 wherein an ID generator coupled to said forward transmitter initially generates said identifier as an original identifier.

29. The method of claim 28 wherein said ID generator utilizes a pseudo-random generator to generate said original identifier.

30. The method of claim 28 wherein said ID generator provides said original identifier to said reverse receiver, said ID generator also providing said original identifier to a digital processor A of said forward transmitter for embedding into said forward data.

31. The method of claim 21 wherein a forward demodulator demodulates said forward data, and a digital processor B processes said forward data before said forward data is provided to a data destination.

32. The method of claim 21 wherein a digital processor B of said forward receiver combs an original identifier out of said forward data, said original identifier being initially embedded into said forward data by said forward transmitter, said digital processor B then providing said original identifier to said reverse transmitter.

33. The method of claim 21 wherein a digital processor C processes said reverse data, and a reverse modulator modulates said reverse data before said reverse data is transmitted to said reverse receiver on said reverse link.

34. The method of claim 21 wherein said reverse data includes status information corresponding to a data destination that utilizes said forward data, said reverse data further including control information for controlling a data source that initially provides said forward data, said reverse data also including internal control/status information from a destination communications manager to either said data source or a source communications manager.

35. The method of claim 21 wherein a digital processor C of said reverse transmitter embeds said identifier as a returned identifier into said reverse data before a reverse modulator of said reverse transmitter modulates said reverse data for transmitting over said reverse link.

36. The method of claim 21 wherein a reverse demodulator of said reverse receiver demodulates said reverse data from said reverse link, and wherein a digital processor D of said reverse receiver combs said identifier as a returned identifier from said reverse data.

37. The method of claim 21 wherein said reverse receiver includes an ID comparator that compares an original identifier from said forward transmitter with a potential returned identifier from said reverse transmitter to determine whether said reverse receiver is correctly coupled to said reverse transmitter on said one of said plurality of said reverse channels.

38. The method of claim 37 wherein a controller D instructs said reverse receiver to select a different one of said plurality of said reverse channels when said ID comparator determines that said reverse receiver is not correctly coupled to said reverse transmitter, said controller D instructing a digital processor D to provide said reverse data to a data destination when said ID comparator determines that said reverse receiver is correctly coupled to said reverse transmitter.

39. A method for performing a reverse channel selection procedure, comprising the steps of:
- utilizing a forward transmitter to embed an identifier into forward data that is transmitted over a forward link;
- receiving said forward data on said forward link with a forward receiver that removes said identifier from said forward data;
- utilizing a reverse transmitter to embed said identifier into reverse data that is transmitted on one of a plurality of reverse channels over a reverse link;
- searching said plurality of said reverse channels with a reverse receiver to locate said one of said plurality of said reverse channels containing said reverse data with said identifier embedded, said reverse receiver then utilizing said reverse data received over said one of said plurality of said reverse channels;
- utilizing a data source to initially provide said forward data to a source communications manager that includes said forward transmitter and said reverse receiver; and
- utilizing a data destination to receive said forward data from a destination communications manager that includes said forward receiver and said reverse transmitter, said data source including a video programming source, said forward data including video program data, and said data destination including a video programming display device.

40. A method for performing a reverse channel selection procedure, comprising the steps of:
- utilizing a forward transmitter to embed an identifier into forward data that is transmitted over a forward link, an ID generator coupled to said forward transmitter initially generating said identifier as an original identifier, said forward transmitter utilizing a random segment of said forward data as said original identifier;
- receiving said forward data on said forward link with a forward receiver that removes said identifier from said forward data;
- utilizing a reverse transmitter to embed said identifier into reverse data that is transmitted on one of a plurality of reverse channels over a reverse link; and
- searching said plurality of said reverse channels with a reverse receiver to locate said one of said plurality of said reverse channels containing said reverse data with said identifier embedded, said reverse receiver then utilizing said reverse data received over said one of said plurality of said reverse channels.

41. A method for performing a reverse channel selection procedure, comprising the steps of:
- utilizing a forward transmitter to embed an identifier into forward data that is transmitted over a forward link;
- receiving said forward data on said forward link with a forward receiver that removes said identifier from said forward data;
- utilizing a reverse transmitter to embed said identifier into reverse data that is transmitted on one of a plurality of reverse channels over a reverse link, said reverse transmitter being implemented as a transceiver device that evaluates said one of said plurality of said reverse channels to ensure that said one of said plurality of said reverse channels is clear before transmitting said reverse data; and
- searching said plurality of said reverse channels with a reverse receiver to locate said one of said plurality of said reverse channels containing said reverse data with said identifier embedded, said reverse receiver then utilizing said reverse data received over said one of said plurality of said reverse channels.

42. A system for performing a reverse channel selection procedure, comprising:
- means for embedding an identifier into forward data that is transmitted over a forward link, said identifier being randomly selected by an ID generator;
- means for receiving said forward data on said forward link, said means for receiving then removing said identifier from said forward data;

means for inserting said identifier into reverse data that is transmitted on one of a plurality of reverse channels over a reverse link; and means for searching said plurality of said reverse channels to locate said one of said plurality of said reverse channels containing said reverse data with said identifier embedded, said means for searching then utilizing said reverse data received over said one of said plurality of said reverse channels.

43. A system for performing a reverse channel selection procedure, comprising:

a forward transmitter that embeds an identifier into forward data that is transmitted over a forward link, said identifier being randomly selected by an ID generator;

a forward receiver that receives said forward data on said forward link;

a reverse transmitter that receives said forward data from said forward receiver, said reverse transmitter responsively transmitting reverse data and said identifier on one of a plurality of reverse channels over a reverse link; and a reverse receiver that searches said plurality of said reverse channels to locate said one of said plurality of said reverse channels containing said reverse data and said identifier, said reverse receiver then utilizing said reverse data received over said one of said plurality of said reverse channels.

\* \* \* \* \*